United States Patent [19]

Munn

[11] Patent Number: 4,655,106
[45] Date of Patent: Apr. 7, 1987

[54] TUBE OR PIPE PROFILING APPARATUS

[75] Inventor: David C. Munn, Abingdon, England

[73] Assignee: Tube Runner Limited, Oxfordshire, England

[21] Appl. No.: 784,788

[22] Filed: Oct. 4, 1985

[30] Foreign Application Priority Data

Oct. 11, 1984 [GB] United Kingdom ................. 8425711

[51] Int. Cl.⁴ ............................................. B23B 5/16
[52] U.S. Cl. ..................................................... 82/4 C
[58] Field of Search ..................... 82/4 C, 4 R; 408/82

[56] References Cited

U.S. PATENT DOCUMENTS

| | | | |
|---|---|---|---|
| 3,051,059 | 8/1962 | Davey | 408/82 |
| 3,229,555 | 1/1966 | Castles, Jr. | 82/4 R |
| 4,470,734 | 9/1984 | Miller | 82/4 C |

Primary Examiner—Leonidas Vlachos
Attorney, Agent, or Firm—Bruns and Wall

[57] ABSTRACT

Apparatus is provided for profiling the end faces of pipes or tubes. The apparatus comprises a shaft one end of which is insertable into the open end of a pipe or tube to be profiled, collett means on said one end of the shaft, and cutting means rotatably mounted on said shaft for profiling the end face of the pipe or tube. The collett means comprises first and second screw threads of opposite hand on said one end of said shaft, a nut in threaded engagement with each of said screw threads, the nuts being movable in opposite directions along said screw threads when the shaft is rotated, and engaging means supported on said nuts and movable radially of said shaft into or out of engagement with the internal surface of the pipe or tube when the nuts are moved along said screw threads by rotation of said shaft. The screw threads are preferably coarse threads which with the differential effect of the opposed screw threads provides rapid engagement and disengagement of the collett means.

9 Claims, 1 Drawing Figure

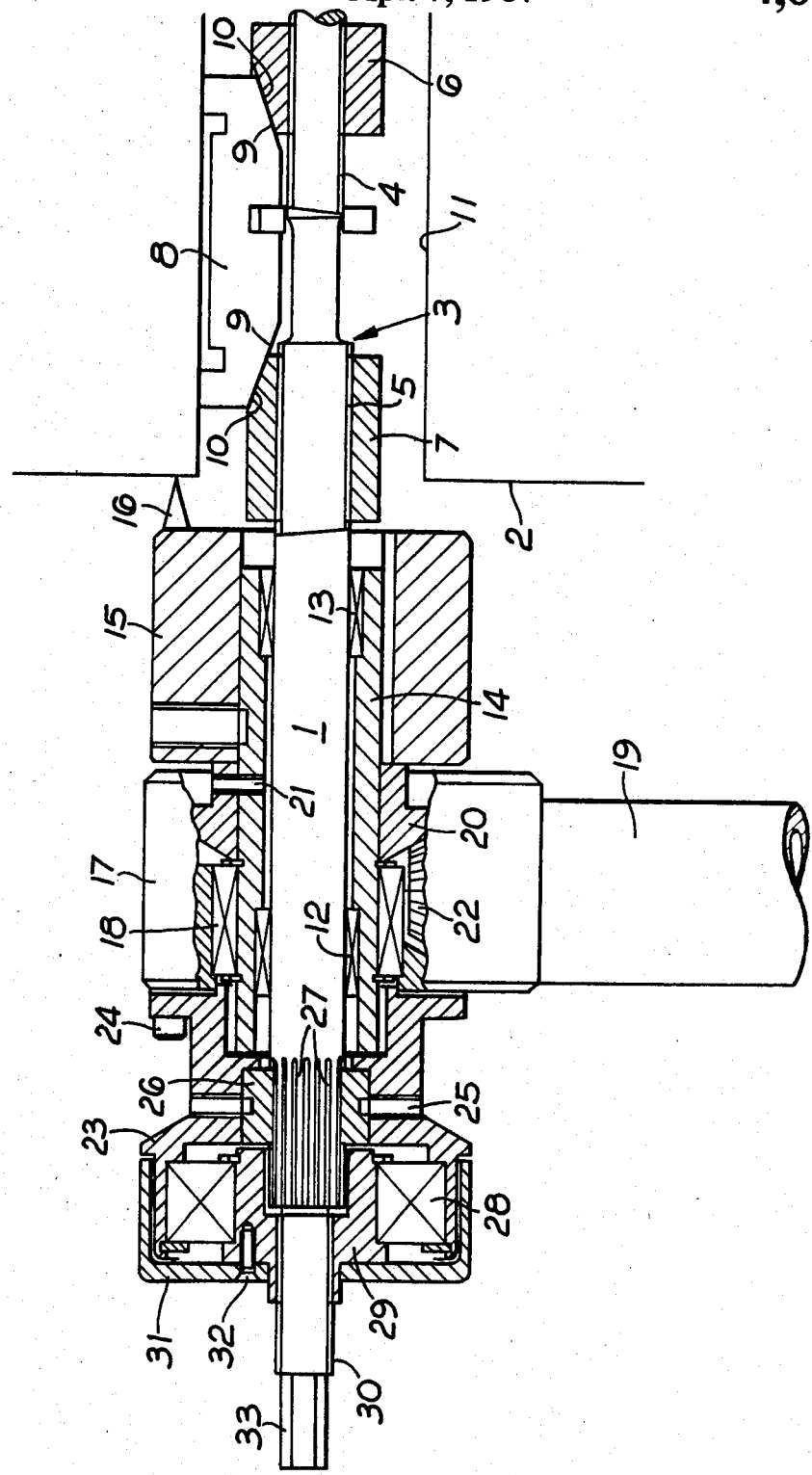

TUBE OR PIPE PROFILING APPARATUS

BACKGROUND OF THE INVENTION

This invention relates to apparatus for profiling the end faces of pipes or tubes.

It is frequently required to profile the end faces of pipes or tubes, e.g., to prepare them for a welding operation, and apparatus is known for this purpose. Generally, such tube or pipe profiling apparatus comprises collett means which can be inserted into an end of a pipe or tube the end face of which is to be profiled and which can be expanded into engagement with the internal surface of the pipe or tube by means of a screw threaded nut. It is frequently the case that a large number of identical tubes or pipes, e.g., condenser tubes, require profiling and that each time a profile has been provided on an end face of one pipe or tube the nut must be unscrewed, the collett inserted into the next pipe or tube and the nut then tightened. Even if the nut is coarse threaded, several turns may be necessary to loosen and then retighten the nut so that the transfer of the apparatus from one pipe or tube to the next is time consuming. Moreover, the spanner wrench required for loosening and tightening the nut is a loose item which can readily become lost or mislaid.

Also, with known tube or pipe profiling apparatus, the torque reaction resulting from the cutting operation is usually transmitted either to the operator or to an external fixture.

SUMMARY OF THE INVENTION

The present invention has as its object to provide improved tube or pipe profiling apparatus.

The present invention provides apparatus for profiling the end face of pipes or tubes, the apparatus comprising a shaft one end which is insertable into the open end of a pipe or tube to be profiled, collett means on said one end of said shaft, the collett means being expandable into engagement with the internal surface of the pipe or tube by rotation of said shaft to support the apparatus relative to the pipe or tube, and cutting means rotatably mounted on said shaft for profiling the end face of the pipe or tube, the collett means comprising first and second screw threads of opposite hand on said one end of said shaft, a nut in threaded engagement with each of said screw threads, said nuts being movable in opposite directions along said screw threads when the shaft is rotated, engaging means supported on said nuts and means for moving said engaging means radially of said shaft into or out of engagement with the internal surface of the pipe or tube when said nuts are moved along said screw threads by rotation of said shaft. Preferably, said screw threads are coarse threads.

The said first and second screw threads, being opposite screw threads, form a differential screw pair. Accordingly, when each said screw thread is a coarse thread only a small angular movement of said shaft is required to effect engagement or disengagement of the engaging means with the internal surface of a tube or pipe due to the differential effect of the opposed screw threads.

The apparatus of the present invention may comprise drive means mounted on said shaft for driving said cutting means and a housing for said drive means, said housing being connected to said shaft for rotation therewith. In this way, torque reaction on said housing from said cutting means is transmitted to said shaft, and hence to said collett means. In addition, rotation of said shaft to engage or disengage said collett means with the internal surface of a pipe or tube can be effected by rotating said housing.

Preferably, said cutting means, said drive means and said housing are movable longitudinally of said shaft to move said cutting means into or out of cutting engagement with the end face of a pipe or tube when the collett means has been engaged with the internal surface of the pipe or tube. To this end the housing may be connected to said shaft by means of cooperating splines, a key and keyway or other suitable means which will allow the housing to rotate with the shaft and be moved longitudinally thereof.

Said shaft may have a third screw thread thereon and said housing may rotatably support a hand wheel in threaded engagement with said third screw thread for moving said cutting means, said drive means and said housing longitudinally of said shaft.

Said drive means may comprise a sleeve rotatably mounted on said shaft and having said cutting means mounted thereon for rotation therewith, a bevel gear on said sleeve and rotatable therewith, a pinion in meshing engagement with said bevel gear and a motor for driving said pinion. The housing may comprise a hollow handle portion which extends radially of said shaft and such hollow handle portion may house said motor. The motor may be an air motor or other suitable prime mover.

The means for moving said engaging means radially of said shaft when said nuts are moved along said screw threads may comprise cooperating cam surfaces on said nuts and on said engaging means.

Said shaft may have a non-circular portion thereon, e.g., flats thereon or a portion which is hexagonal or otherwise suitably formed and which is engageable by a tool, such as a spanner wrench, to effect rotation of the shaft. Such non-circular portion provides a convenient means of engaging and disengaging the collett means in situations where space is restricted and it is difficult to rotate said housing e.g., as by means of said handle portion, to effect rotation of said shaft.

BRIEF DESCRIPTION OF THE DRAWINGS

The invention will be more particularly described with reference to the accompanying drawing, the single FIGURE of which is a part sectional elevation of one embodiment of tube or pipe profiling apparatus according to the present invention.

DESCRIPTION OF THE INVENTION

The apparatus illustrated in the drawing comprises a shaft 1 one end of which is insertable into the tube or pipe diagramatically illustrated at 2 and which has thereon collett means generally designated 3. The collett means comprises a first screw thread 4 of one hand and a second screw thread 5 of the opposite hand on said one end of the shaft 1. A nut 6 is in threaded engagement with the screw thread 4 and a nut 7 is in threaded engagement with the screw thread 5. Because the screw threads 4 and 5 are of opposite hand, the nuts 6 and 7 will move in opposite directions along the shaft 1 when the shaft 1 is rotated to provide a differential screw effect. The screw threads 4 and 5 are coarse threads. Supported on the nuts 6 and 7 are a plurality, e.g., three, of engaging means in the form of fins 8 which are equally spaced around the shaft 1. The fins 8 have cam surfaces 9 thereon which cooperate with cam surfaces 10 on the nuts 6 and 7 for moving the fins 8 radially of the shaft 1 when the nuts 6 and 7 are moved by rotation of the shaft 1 to move the fins 8 into or out of engagement with the internal surface 11 of the pipe or tube 2. Because the screw threads 4 and 5 are coarse threads and due to the differential effect of these threads being of opposite hand, only a small angular movement of the shaft 1 is required to engage the collett means 3 with or disengage it from the internal surface of the tube or pipe 2, so enabling rapid engagement of the apparatus with and release of the apparatus from a tube or pipe.

Rotatably mounted on the shaft 1 by means of bearings 12, 13 is a sleeve 14 on which is mounted for rotation therewith a tool head 15 carrying a cutting tool 16. A drive housing 17 is mounted by way of a bearing 18 on the sleeve 14 for rotation relative thereto. The drive housing 17 comprises a handle portion 19 which extends radially of the shaft 1 and which is hollow and contains an air motor or other suitable prime mover (not shown). Within the drive housing 17 is a bevel gear 20 which is fixedly secured to the sleeve 14 by means of a screw, peg or the like 21 and a pinion 22 in meshing engagement with the bevel gear 20. The pinion 22 is driven by the said air motor or other prime mover contained within the handle portion 19.

An end housing 23 is secured to the drive housing 17 by means of bolts 24. Mounted in the end housing 23 by means of screws, pins or the like 25 is an internally splined annular member 26 the splines of which are in sliding engagement with splines 27 on the shaft 1. By virtue of this spline engagement the end housing 23, and motor housing 17 are rotatable with the shaft 1 whilst being free to move together with the tool head 15 longitudinally of the shaft 1 to enable the cutting tool 16 to be moved into or out of engagement with the end face of the tube or pipe 2.

Rotatably mounted within the end housing 23 by means of a bearing 28 is a nut member 29 which is in screw threaded engagement with a third screw thread 30 on the shaft 1. The nut 29 is rotatable by means of a handwheel 31 to which it is secured by means of a screw 32. Manual rotation of the handwheel 31 causes the nut 29 to traverse along the thread 30 to advance or withdraw the cutting tool 16.

The outer end 33 of the shaft 1 is of hexagonal or other suitable non-circular cross-section which can be engaged by a suitable tool, such as a spanner, to enable the shaft 1 to be rotated to engage or disengage the collett means 3 in situations where due to restricted access the handle 19 cannot be moved angularly to effect such engagement or disengagement.

In use, the apparatus of the present invention can be held by the handle portion 19 in one hand and the tool head 15 in the other hand and the collett means 3 inserted into the open end of a pipe or tube 2 to be profiled. At this time is light fictional engagement between the collect means 3 and the inner surface of the pipe or tube 2. Because of the differential effect of the screw threads 4, 5 and because these threads are coarse threads, only a small angular movement of the handle portion 19 relative to the tool head 15 is required to effect rapid engagement of the collett means 3 with the internal surface 11 of the pipe or tube 2. The dutting tool 16 can then be advanced into cutting engagement with the end face of the pipe or tube 2 by actuation of the handwheel 31. When profiling of the end face of the pipe or tube 2 is complete, the cutting tool 16 can be retracted by means of the handwheel 31 and the apparatus rapidly disengaged from the pipe or tube 2 by a reverse angular movement of the handle portion 19.

While this invention has been described with specific reference to the details as set forth above, it is not intended to be limited to this specific structure and the invention is intended to cover any modifications or changes that may come within the scope of the following claims.

What is claimed is:

1. Apparatus for profiling end faces of pipes or tubes, the apparatus comprising:

a shaft, one end of which is insertable into an open end of a pipe or tube to be profiled;

collett means expandable into engagement with an internal surface of said pipe or tube, said collett means including first and second screw threads of opposite hand on said one end of said shaft, first and second nuts in threaded engagement with the respective first and second screw threads, said nuts being movable in mutually opposite directions along said one end of the shaft when said shaft is rotated, and engaging means supported on said nuts for engaging the internal surface of said pipe or tube;

means for moving said engaging means radially of said shaft into and out of engagement with the internal surface of the pipe or tube when said nuts are moved along the screw threads of said shaft by rotation of said shaft;

cutting means rotatably mounted on said shaft for profiling the end face of the pipe or tube;

drive means mounted on said shaft for driving said cutting means, and a housing for said drive means said housing including means selectively coupling the housing to said shaft for rotation therewith such that torque reaction on said housing from said cutting means can be transmitted through said shaft to said collett means, said shaft being selectively rotatable by rotation of said housing to effect the engagement or disengagement of said collett means, wherein said shaft has a third screw thread thereon and wherein said housing rotatably supports means in threaded engagement with said third screw thread for moving said cutting means, said drive means and said housing longitudinally of said shaft.

2. Apparatus according to claim 1, wherein said screw threads are coarse threads.

3. Apparatus according to claim 1, wherein said means selectively coupling the housing to the shaft includes spline means engageable with cooperating means on said shaft.

4. Apparatus according to claim 1 wherein said means notatably supported by said housing includes a handwheel.

5. Apparatus according to claim 1, wherein said housing is connected to said shaft by means of cooperating splines.

6. Apparatus according to claim 1, wherein said drive means comprises a sleeve rotatably mounted on said shaft and having said cutting means mounted thereon for rotation therewith, a bevel gear on said sleeve and rotatable therewith, a pinion in meshing engagement with said bevel gear and a motor for driving said pinion.

7. Apparatus according to claim 6, wherein said housing comprises a hollow handle portion which extends radially of said shaft and which houses said motor.

8. Apparatus according to claim 1, wherein said means for moving said engaging means radially of said shaft when said nuts are moved along said screw threads comprises cooperating cam surfaces on said nuts and said engaging means.

9. Apparatus according to claim 1, wherein said shaft has a non-circular portion thereon which is engageable by a tool to effect rotation of the shaft.

* * * * *

UNITED STATES PATENT AND TRADEMARK OFFICE
CERTIFICATE OF CORRECTION

PATENT NO. : 4,655,106

DATED : April 7, 1987

INVENTOR(S) : DAVID CURTIS MUNN

It is certified that error appears in the above-identified patent and that said Letters Patent is hereby corrected as shown below:

Column 4, line 35 - insert comma after "means"

line 55 - "notatably" should read "rotatably"

Signed and Sealed this

Eighth Day of September, 1987

*Attest:*

DONALD J. QUIGG

*Attesting Officer*      *Commissioner of Patents and Trademarks*